United States Patent [19]

Anderson

[11] Patent Number: 4,903,334
[45] Date of Patent: Feb. 20, 1990

[54] SYSTEM FOR PREVENTING CROSSTALK IN A MULTI-INPUT ELECTRONIC DEVICE

[75] Inventor: Mark R. Anderson, Indianapolis, Ind.

[73] Assignee: Thomson Consumer Electronics, Inc., Indianapolis, Ind.

[21] Appl. No.: 190,136

[22] Filed: May 5, 1988

[51] Int. Cl.$^4$ ............................................. H04B 1/10
[52] U.S. Cl. .................................... 455/295; 455/174; 358/165
[58] Field of Search ............... 455/174, 295, 221, 212, 455/220, 312; 358/165

[56] References Cited

U.S. PATENT DOCUMENTS

| | | | |
|---|---|---|---|
| 3,806,818 | 4/1974 | Uchiyama | 455/174 |
| 4,107,614 | 8/1978 | Sugai | 358/165 |
| 4,280,139 | 7/1981 | Mogi et al. | 455/174 |
| 4,641,190 | 2/1987 | Testin et al. | 358/165 |

FOREIGN PATENT DOCUMENTS

| | | | |
|---|---|---|---|
| 2513344 | 9/1976 | Fed. Rep. of Germany | 358/165 |
| 3447282 | 7/1986 | Fed. Rep. of Germany | 455/295 |
| 0029224 | 2/1983 | Japan | 455/295 |
| 0216528 | 9/1986 | Japan | 455/295 |

OTHER PUBLICATIONS

RCA Color Television Supplement Service Data 1987, CTC 140-53.
RCA COS/MOS Integrated Circuits Manual SSD-250B.
Data Sheet for the Motorola 68HC05.
Data Sheet for the NEC UPC 1870 CA.

*Primary Examiner*—Benedict V. Safourek
*Assistant Examiner*—Curtis Kuntz
*Attorney, Agent, or Firm*—Joseph S. Tripoli; Peter M. Emanuel; Thomas F. Lenihan

[57] ABSTRACT

A system for preventing crosstalk in a stereo television receiver includes a signal selection switch for selecting between signals produced by a demodulator and signals received at an auxiliary input, a controller for generating a switching control signal and circuitry for muting the audio demodulator during channel change and when said auxiliary input is selected in response to said switching control signal.

7 Claims, 1 Drawing Sheet

SYSTEM FOR PREVENTING CROSSTALK IN A MULTI-INPUT ELECTRONIC DEVICE

BACKGROUND

This invention relates generally to the prevention of crosstalk in electronic devices selectively receiving inputs from a plurality of sources and particularly to a television receiver having stereo/audio capability and auxiliary input capability.

Crosstalk is a problem in electronic equipment having a plurality of inputs which are selectively utilized. Crosstalk is the undesirable pickup of signals from unselected input lines by the lines receiving the selected input. The problem has been frequently recognized in the past and the typical techniques for eliminating crosstalk include either shielding the various lines, or increasing the spacing between the lines. These solutions are not available in devices employing solid state devices because of severe space limitations. An example of equipment which utilizes a selected input from several available inputs is a television receiver which has both stereo/audio capability and one or more auxiliary inputs. The auxiliary inputs can be video inputs for VCR, game inputs, and other types of inputs available in the more expensive TV receivers. In receivers of this type, when an auxiliary input is selected the stereo capability is not needed but can degrade the selected input because of crosstalk. Modern day television receivers of this type typically include solid state devices such as integrated circuits and microprocessors. Accordingly, the prior art techniques of eliminating crosstalk which include shielding the conductors or increasing the conductor spacing are not available. For these reasons there is a need for a system for preventing crosstalk in multi-input electronic devices composed of solid state devices. The present invention fulfills this need.

SUMMARY

A system for preventing crosstalk in a device having a source selection switch for selecting between inputs from a demodulator, e.g., a stereo demodulator and at least one auxiliary input in response to a source selection signal from a control means, includes means for applying a muting signal to the demodulator in response to a source selection signal from the control means.

DETAILED DESCRIPTION

Figure 1:
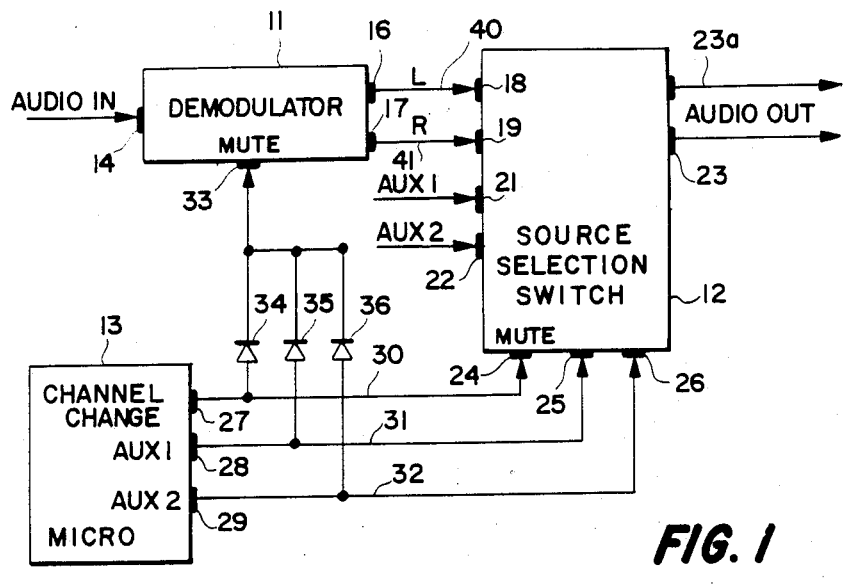
FIG. 1 is a simplified block diagram of a portion of a television receiver incorporating a first preferred embodiment.

In FIG. 1, a television receiver having stereo/audio capability includes a demodulator 11, a source selection switch 12 and a control means 13, such as a microprocessor, all of which are standard in stereo capability television receivers and all of which are known in the art. For example, the demodulator 11 can be a NEC part #UPC 1870 CA chip, the source selection switch 12 can be a RCA Solid State Div part #CD4052 and the microprocessor 13 can be a Motorola part #68HC05. The demodulator 11 includes an audio input terminal 14 which receives the audio signal. Output terminals 16 and 17 provide the demodulated left (L) and right (R) stereo/audio signal components to the source selection switch 12 via audio input terminals 18 and 19 and lines 40 and 41 respectively. The source selection switch 12 also includes auxiliary (AUX) input terminals 21 and 22 which are used to provide input signals from auxiliary equipment, such as VCR's and games. The audio output of the source selection switch 12 is provided on audio output terminals 23 and 23a. The source selection switch 12 includes a mute input terminal 24 and two auxiliary input terminals 25 and 26. The controlling microprocessor 13 includes a channel change output 27, an auxiliary 1 (AUX1) output terminal 28, and an auxiliary 2 (AUX2) output terminal 29, which are respectively coupled to the input terminals 24, 25 and 26 of the source selection switch 12 by lines 30, 31 and 32 respectively. The stereo demodulator 11 includes a mute input terminal 33. The output lines 30, 31 and 32 of the controlling microprocessor 13 are coupled to the mute input terminal 33 by voltage responsive electron control means 34, 35 and 36, respectively, which are diodes in this embodiment.

In operation, the output terminals 27, 28, and 29 of the microprocessor 13 are normally low and the diodes 34, 35 and 36 are nonconductive. In this condition the stereo demodulator 11 receives a stereo/audio input signal and provides the audio signal to the source selection switch 12. When a viewer changes to a different channel, the channel change output terminal 27 of the microprocessor 13 goes high causing the diode 34 to become conductive and cause the mute input terminal 33 of the demodulator 11 to also go high and mute the demodulator during the channel change. The high on the channel change output terminal 27 is also provided to the mute input terminal 24 of the source selection switch to mute any audio which may be available because one of the auxiliary 1 or auxiliary 2 inputs is providing an input signal to the source selection switch 12. The muting of the audio is used to prevent any popping sound which could otherwise occur during channel selection. The commands to the microprocessor 13 which result in any change to the status of the output terminals 27, 28 and 29 are provided by a keyboard on the receiver and are initiated by the viewer when the viewer selects a particular channel, or one of the auxiliary inputs AUX1 or AUX2. When either AUX1 or AUX2 is selected, the associated output terminal 28 or 29 goes high to render one of the diodes 35 or 36 conductive and cause the mute input terminal 33 of the demodulator 11 to go high and mute the demodulator and temporarily prevent stereo/audio from being provided by the output terminals 16 and 17. The muting of the demodulator 11 therefore prevents crosstalk from the lines 40 and 41, and the terminals 16 to 19 and all subsequent circuitry.

Figure 2:
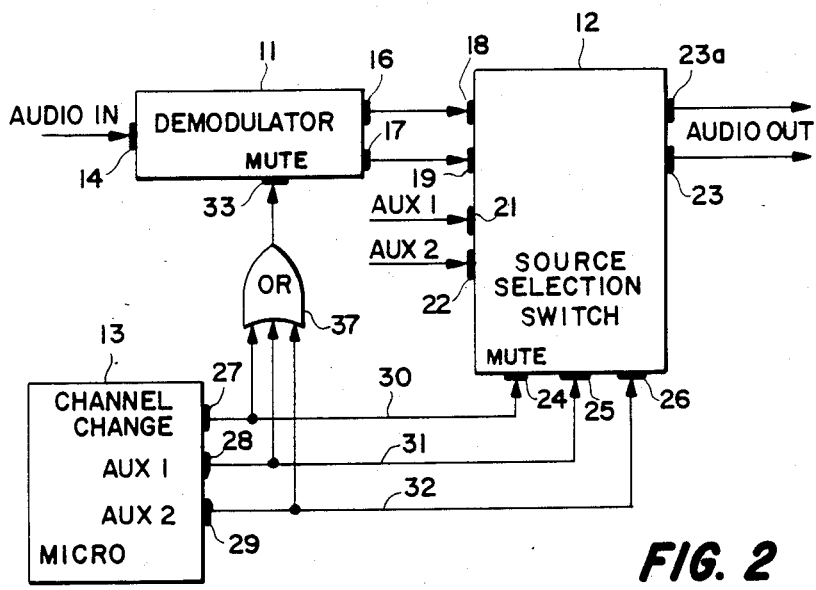
FIG 2 is a simplified block diagram of a portion of a television receiver employing a second preferred embodiment.

In FIG. 2, the demodulator 11, source selection switch 12 and controlling microprocessor 13 are identical to those of FIG. 1, as indicated by the like reference numbers. However, the voltage responsive electron control means 34, 35 and 36 of FIG. 1 are replaced by logic means 37, which preferably is an OR gate. The input terminals of the OR gate 37 are coupled to the lines 30, 31 and 32 whereby a high on either of the lines 31, 30 or 32 causes the mute input terminal 33 of the demodulator 11 to go high and mute the demodulator in the same manner as in FIG. 1. It is noteworthy that some types of microprocessors may include internal electron control devices which can be used to replace the diodes 34, 35 and 36, or the OR gate 37, when the devices are not needed for other microprocessor functions.

What is claimed is:

1. A system for preventing crosstalk between inputs of a device having a plurality of inputs, said system comprising:
    a source of a first signal;
    means for receiving a second signal;
    control means for generating a selection control signal;
    signal selection means coupled to said control means and having a first input coupled to said source of said first signal and a second input coupled to said means for receiving said second signal respectively, and being responsive to said selection control signal for selectively producing one of said first and second signals at an output; and
    muting means coupled to said control means and to said source of said first signal and responsive to said selection control signal for generating a muting signal and applying said muting signal to said source of said first signal for muting said source of said first signal when said second signal is selected.

2. The system of claim 1 wherein said muting means includes a plurality of voltage responsive electron control means and said source of said first signal includes a muting input terminal.

3. The system of claim 2 wherein said voltage responsive electron control means are diodes.

4. The system of claim 1 wherein said muting means is an OR gate.

5. A television audio selection system comprising:
    a demodulator having a mute input terminal;
    a signal selection switch having an audio input terminal for receiving an audio input signal from said demodulator, said signal source selection switch having an auxiliary input terminal for receiving an input signal from an auxiliary source, said source selection switch also having a terminal for receiving a selection signal;
    control means having an output terminal for providing said selection signal to said selection terminal; and
    logic means arranged between said output terminal and said mute input terminal of demodulator for muting said demodulator in response to said selection signal when said auxiliary source is selected.

6. The system of claim 5 wherein said logic means is an OR gate.

7. The system of claim 5 wherein said logic means is a plurality of diodes.

* * * * *

UNITED STATES PATENT AND TRADEMARK OFFICE
CERTIFICATE OF CORRECTION

PATENT NO. : 4,903,334
DATED : February 20, 1990
INVENTOR(S) : Mark Robert Anderson It is certified that error appears in the above-identified patent and that said Letters Patent is hereby corrected as shown below:

On the Title Sheet, [21] Appl. No.: "190,136" should be -- 190,436 --.

Signed and Sealed this

Fourth Day of December, 1990

*Attest:*

HARRY F. MANBECK, JR.

*Attesting Officer*          *Commissioner of Patents and Trademarks*